(12) United States Patent
Wilson

(10) Patent No.: US 12,284,085 B2
(45) Date of Patent: *Apr. 22, 2025

(54) SYSTEMS AND METHODS FOR MODELING AND OPTIMIZING A TELECOMMUNICATIONS NETWORK

(71) Applicant: CenturyLink Intellectual Property LLC, Broomfield, CO (US)

(72) Inventor: Daniel Wilson, Annapolis, MD (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,646

(22) Filed: Feb. 14, 2024

(65) Prior Publication Data

US 2024/0187333 A1    Jun. 6, 2024

Related U.S. Application Data

(63) Continuation of application No. 18/087,468, filed on Dec. 22, 2022, now Pat. No. 11,909,625, which is a continuation of application No. 16/998,217, filed on Aug. 20, 2020, now Pat. No. 11,552,877.

(60) Provisional application No. 62/889,818, filed on Aug. 21, 2019.

(51) Int. Cl.
| | | |
|---|---|---|
| H04L 41/14 | (2022.01) | |
| H04L 41/12 | (2022.01) | |
| H04L 45/00 | (2022.01) | |
| H04L 45/12 | (2022.01) | |
| H04L 45/28 | (2022.01) | |
| H04L 45/50 | (2022.01) | |

(52) U.S. Cl.
CPC ............ *H04L 41/145* (2013.01); *H04L 41/12* (2013.01); *H04L 45/12* (2013.01); *H04L 45/22* (2013.01); *H04L 45/28* (2013.01); *H04L 45/50* (2013.01)

(58) Field of Classification Search
CPC ....... H04L 41/145; H04L 45/12; H04L 45/22; H04L 45/28; H04L 45/50
See application file for complete search history.

(56) References Cited

U.S. PATENT DOCUMENTS

| | | | |
|---|---|---|---|
| 6,044,075 A | 3/2000 | Le Boudec | |
| 8,935,561 B2 | 1/2015 | Wang | |
| 10,148,551 B1 * | 12/2018 | Wood | ...................... H04L 41/12 |

(Continued)

*Primary Examiner* — Melanie Jagannathan

(57) ABSTRACT

Aspects of the present disclosure include systems, methods, computing devices, computer-implemented methods, and the like for modeling and/or simulating performance of a telecommunications network during one or more failure scenarios that reduces computational time and/or power over previous simulation techniques. Modeling and simulating the network may include generating an initial network model from network data information and applying one or more transformations to the initial network model to reduce the size of the model. Following transformation, simulation methods may be applied to the generated network model based on routing characteristics of the components of the network. To reduce the computations utilized to simulate such components and/or routing decisions in the network, one or more simulation algorithms may be applied to the transformed network model to reduce the number of routing decisions simulated.

18 Claims, 7 Drawing Sheets

(56) References Cited

U.S. PATENT DOCUMENTS

| | | |
|---|---|---|
| 10,298,488 B1 | 5/2019 | Wood |
| 2004/0255049 A1* | 12/2004 | Italiano ............... H04L 63/0272 |
| | | 709/250 |
| 2005/0086520 A1 | 4/2005 | Dharmapurikar |
| 2008/0112387 A1 | 5/2008 | Gandham |
| 2010/0040070 A1* | 2/2010 | Suh ........................ H04L 45/66 |
| | | 370/400 |
| 2010/0061264 A1 | 3/2010 | Campbell |
| 2012/0250500 A1 | 10/2012 | Liu |
| 2015/0207727 A1 | 7/2015 | Roy |
| 2019/0182119 A1 | 6/2019 | Ratkovic |
| 2020/0344154 A1 | 10/2020 | Ying |
| 2020/0349128 A1 | 11/2020 | Portisch |
| 2021/0058314 A1 | 2/2021 | Wilson |
| 2021/0311857 A1 | 10/2021 | Bures |
| 2022/0066456 A1 | 3/2022 | Afrouzi |
| 2022/0232024 A1 | 7/2022 | Kapoor |
| 2022/0245441 A1* | 8/2022 | Dechene ................ G06N 3/006 |
| 2023/0137091 A1 | 5/2023 | Wilson |
| 2023/0186070 A1* | 6/2023 | Makhija ................... G06N 5/01 |
| | | 705/318 |

* cited by examiner

SYSTEMS AND METHODS FOR MODELING AND OPTIMIZING A TELECOMMUNICATIONS NETWORK

TECHNICAL FIELD

Embodiments of the present invention generally relate to systems and methods for implementing a telecommunications network, and more specifically for modeling and simulating a performance of a telecommunications network during one or more failure scenarios.

BACKGROUND

Modeling the performance of a telecommunication network may aid administrators of the network in configuring the topology of the network to respond to various operating conditions. For example, such a network may experience one or more faults (e.g., a failure of a component of the network, an accidental cut of a communication line, power outage, etc.) or performance issues that could negatively impact one or more customers of the network. To help alleviate or even prevent such impacts, network administrators may model the network, generate a hypothetical fault or outage within the model, and analyze the network performance in response to the hypothetical fault. The analysis may provide information to then proactively configure and/or alter the topology of the network to minimize or prevent future actual outages and the attendant effects on customers of the network. In this manner, modeling and simulation of the network may improve the overall performance and robustness of the network.

As telecommunication networks increase in complexity, modeling and simulation of such networks using conventional techniques has become burdensome in both computational needs and time to perform simulations. For reference, some telecommunication networks may include several thousand components interconnected over hundreds of thousands or millions of potential transmission paths through the network. Simulation of the network, and particularly the entire network, may include modeling each component and transmission path of the network, simulating several fault scenarios on the model, and analyzing the results from each simulation. In the case of large complicated networks, such simulations may take hours or even days to complete due to the large number of variables needed to simulate the large number of network components.

It is with these observations in mind, among others, that various aspects of the present disclosure were conceived.

SUMMARY

One aspect of the present disclosure relates to a method for modeling a telecommunications network. The method may include the operations of generating, by a computing device and based on network data, an initial network model comprising nodes representing components of a network and edges representing connections between components of the network and applying a transformation to the initial network model to combine similar nodes and edges of the initial network model and reduce a number of nodes and edges of the initial network model. The method may also include the operations of generating, based on the transformed network model, a shortest path network model comprising edges corresponding to a shortest path determination between a plurality of nodes of the transformed network model and simulating, by the computing device and based on the shortest path network model, a failure scenario of the network, wherein the simulation comprises altering a characteristic of an edge of the shortest path network model based on a routing scheme of the network.

Another aspect of the present disclosure relates to a computing device comprising a processing device and a non-transitory computer-readable medium encoded with instructions, that when executed by the processing device, cause the processing device to perform particular operations. Such operations may include generating, based on network data obtained from a database, an initial network model comprising nodes representing components of a network and edges representing connections between components of the network, applying a transformation to the initial network model to combine similar nodes and edges of the initial network model and reduce a number of nodes and edges of the initial network model, and generating, based on the transformed network model, a shortest path network model comprising edges corresponding to a shortest path determination between a plurality of nodes of the transformed network model. The instructions may also cause the processing device to perform the operations of simulating, based on the shortest path network model, a failure scenario of the network, the simulation comprising altering a characteristic of an edge of the shortest path network model based on a routing scheme of a communication link of the network corresponding to the edge and obtaining, based on the simulated failure scenario, an operating characteristic of the network.

Yet another aspect of the present disclosure relates to a non-transitory computer readable media comprising computer executable instructions to perform a computer-implemented method of modeling a telecommunications network. The computer-implemented method may include operations comprising generating, based on network data obtained from a database, an initial network model comprising nodes representing components of a network and edges representing connections between components of the network and applying a transformation to the initial network model to combine similar nodes and edges of the initial network model and reduce a number of nodes and edges of the initial network model. The computer-implemented method may further include the operations of generating, based on the transformed network model, a shortest path network model comprising edges corresponding to a shortest path determination between a plurality of nodes of the transformed network model and simulating, based on the shortest path network model, a failure scenario of the network, wherein the simulation comprises altering a characteristic of an edge of the shortest path network model based on a routing scheme of the network.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Aspects of the present disclosure include systems, methods, computing devices, techniques, and the like for modeling and/or simulating performance of a telecommunication network, which modeling may include one or more failure scenarios of the network, that reduces computational time and/or power over previous simulation techniques. In general, modeling and simulating the network may include generating an initial network model from network data information (such as component topology, network traffic statistics, geographic network information, etc.) and applying one or more transformations to the initial network model to reduce the size of the model (such as the number of nodes and/or edges within the network model). Following transformation, one or more methods may be applied to the generated (transformed) network model based on routing characteristics of the components of the network. For example, one or more components of the network may utilize Equal Cost Multipath (ECMP) routing or shortest path routing to determine how packets are transmitted through the network. The various routing algorithms or decision trees utilized by components of the network may determine how the network performs in response to a hypothetical fault scenario. To reduce the computations utilized to simulate such components and/or routing decisions in the network, one or more simulation algorithms may be applied to the transformed network model to reduce the number of routing decisions simulated. By reducing the number of routing decisions being simulated, the system may use a corresponding reduction of routing simulations to improve the time and computational power needed to model the network operations and components.

In one particular implementation, one or more fault scenarios may be simulated on the transformed network model generated via the reduction in possible network paths and one or more worst-case network performance values may be obtained. The transformations applied to the network model may then be reversed to return the model to the initial state for analysis of the worst-case performance values on the network model. The worst-case value results of the fault simulations may, in some instances, be analyzed to determine the telecommunications network response to the scenarios, such as the network components and/or connections between the components at which the simulated faults occurred. Further, the information obtained from the simulations may then be applied to the network to reconfigure the topology of the network to adjust the network performance in response to one or more of the simulated fault scenarios and minimize or reduce potential customer outages from such scenarios.

Figure 1:
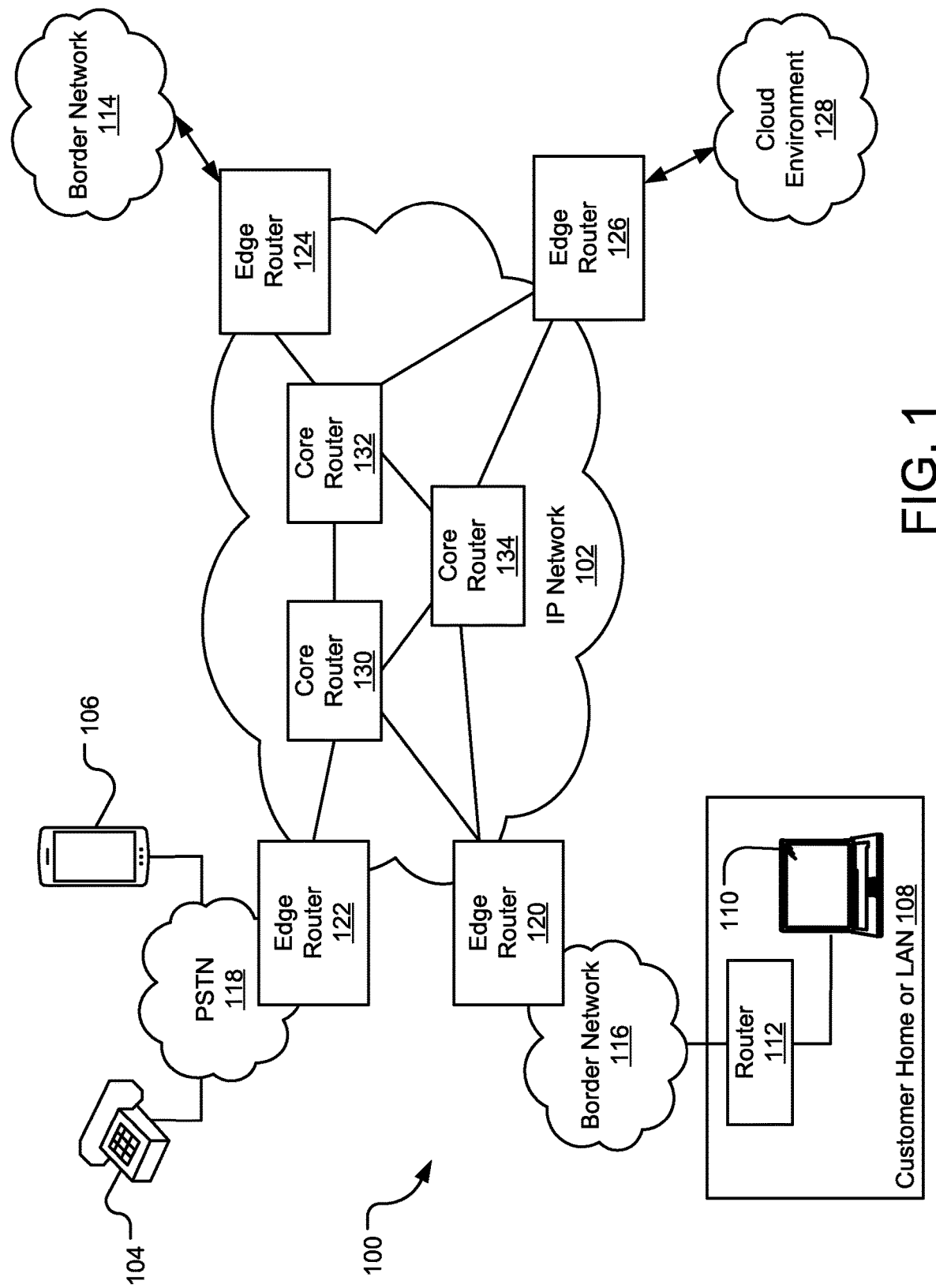
FIG. 1 is a schematic diagram illustrating an exemplary Internet Protocol (IP) network operating environment in accordance with one embodiment.

Turning now to FIG. 1, a schematic diagram illustrating an exemplary network operating environment 100 in accordance with one embodiment. In general, the environment 100 illustrates a sample network from which a network model may be generated and one or more performance simulations of the network may be performed, in accordance with one or more methods described herein. The telecommunications network 100 of FIG. 1 may generally provide for establishing communications between network users and/or providing network services to users and may include data networks. In particular, a backbone network 102 may connect one or more networks or customers to exchange communications. For example, border network 116 may connect to an IP network 102 to provide and receive communications with other networks, such as border network 114, cloud computing environment 128, etc. With specific reference to FIG. 1, the environment 100 includes an IP network 102, which may be provided by a wholesale network service provider. However, while the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching.

To facilitate the transmission of communication packets/data between computing devices, users, networks, etc., the network 102 may include numerous different types of networking devices. Such devices or components may include, but are not limited to gateways, switches, routers, route reflectors, and registrars, which enable communication and/or provide services across the IP network 102. Several example components of the network 102 are illustrated in FIG. 1. In particular, network 102 may include edge routers 120-126 that connect to or otherwise provide an interface between the network 102 and other networks or customers of the network 102. Edge routers 120-126 (or other network edge devices) may transmit and/or receive communication packets into and out of the network 102. Transmission of received packets through the network 102 may be performed by one or more core routers 130-134 (or other core routing devices, such as switches, servers, and the like). Communication paths may connect the components of the network 102 such that one or more packets may be transmitted between customers or networks via the components of the network 102. Such communication paths are illustrated in FIG. 1 as lines connecting the components of the network 102. In this manner, communications between the IP network 102 and other entities or networks, such as the one or more customer home or business local area networks (LANs) 104-108, may be managed through network environment 100.

Customer networks 104-108 can include communication devices such as, but not limited to, a personal computer, wireless communication device, gaming console, etc., connected to a router 112. Although shown in FIG. 1 as computer 110, the communication devices may include any type of communication device that receives a multimedia signal, such as an audio, video or web-based signal, and presents that signal for use by a user of the communication device. In many cases, the computing device 110 may be a wireless computing device. The communication and networking components of the customer network 108 enable a user at the customer network to communicate via the network 102 to other communication devices, such as another customer 104 via public-switched telephone network (PTSN) 118. Access to the Internet may also be provided through the network 102. Components of the customer network 108 are typically home- or business-based, but they can be relocated and may be designed for easy portability. For example, the communication device 110 may be wireless (e.g., cellular) telephone, smart phone, tablet or portable laptop computer.

In some instances, the customer network 108 may connect to the network 102 via a border network 116, such as one provided by an Internet Service Provider (ISP). The border network 116 is typically provided and maintained by a business or organization such as a local telephone company or cable company. The border network 116 may provide network/communication-related services to their customers via the IP network 102. In contrast, communication device 104 and or communication device 106 may access, and be accessed by, the network 102 via PSTN 118 operated by a local exchange carrier (LEC) and connected to the network 102 through edge device 122. Communication via any of the networks can be wired, wireless, or any combination thereof. For ease of instruction, only three communication devices 104, 106, 110 are shown communicating with the network 102; however, numerous such devices, and other devices, may be connected with the network, which is equipped to handle enormous numbers of simultaneous calls and/or other IP-based communications. Further, the network 102 may include numerous other components that may increase the complexity and size of the network 102.

Although discussed above and illustrated to include particular components, it should be appreciated that the network 100 may include a large footprint and utilize hundreds or thousands or network components to provide transmission of communications. For example, some backbone networks may span the globe and may include trans-oceanic communication lines, components located in hundreds of countries around the world, and provide access to the network in millions of locations. Modeling of such large networks may quickly overwhelm many computing systems attempting to account for the vast number of components, configurations, settings, connections, and the like of a large telecommunications network. The components and systems described above with reference to FIG. 1 are provided as mere examples of some aspects of a telecommunications network and it should be appreciated that the network environment 100 may be much larger and more complex than illustrated.

During operation of the network 102, failures of various types may occur. For example, a component of the network 102 may fail, a communication line between components may be cut, a site housing one or more components may lose power, etc. The network 102 may be configured to respond to failures of various kinds to minimize the negative effect to customers of the network. For example, the network 102 may include redundant systems or rerouting procedures such that failures at one or more components may not interrupt services provided to the customers. When a failure is detected, the redundant systems or routes may take over and transmission of communications may commence until the failure is addressed by network engineers. To determine how the network configuration may respond to failures, the network topology and operation may be modeled and one or more failure scenarios may be executed on the network model to determine the network performance during the failure and the overall impact on network traffic due to the modeled failure. With the modeled failure scenario information, the network configuration may be modified or improved to address potential failures and ensure that failover procedures occur rapidly to reduce dropped traffic in the network due to potential failures.

Figure 2:
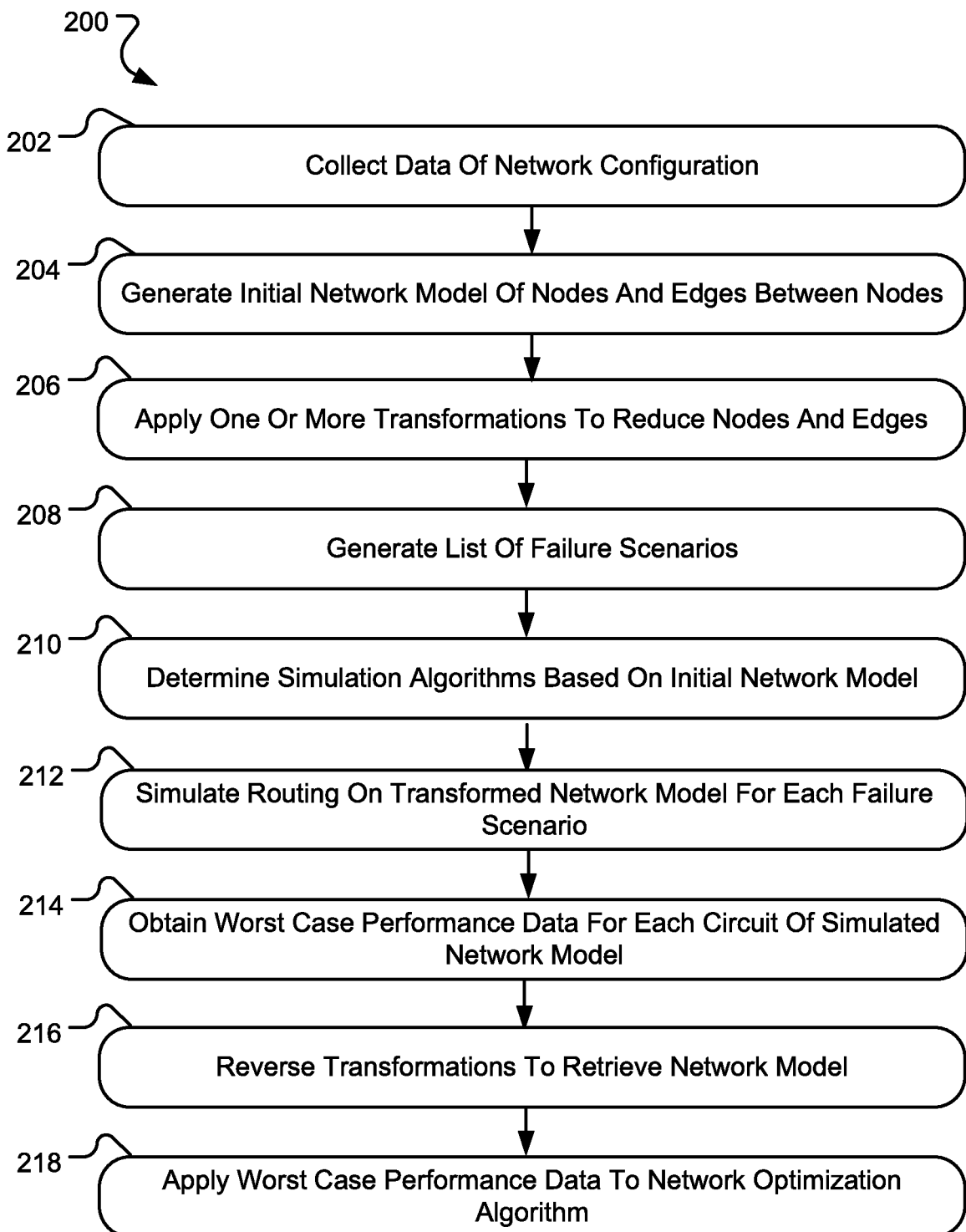
FIG. 2 is a flowchart illustrating a method for modeling a network and executing one or more network failure scenarios on the model in accordance with one embodiment.

FIG. 2 is a flowchart illustrating a method 200 for modeling a network, such as the network environment 100 of FIG. 1, and executing one or more network failure scenarios on the model in accordance with one embodiment. In general, one or more of the operations of the method 200 may be performed by a modeling and simulating computing device (referred to as a "simulator"). In some instances, the simulator may include a computing device that displays or executes a user interface through which one or more user inputs may be received to begin and/or control aspects of the network modeling and simulation. In other instances, the simulator may be configured to automatically perform one or more of the described operations and provide network configuration recommendations or instructions in response to results of one or more of the fault simulations. The simulator may be within the network being modeled or may be separate from the modeled network. The simulator may be connected to or in communication with a network topology database or databases storing information of a network configuration as explained below.

Beginning in operation 202, the simulator may collect data associated with a network being modeled. The network 102 data may include any information associated with a communications network, such as network topology including the interconnections and configurations of network devices, device information of any component of the network, network traffic statistics, routing algorithms or schemes employed in the network, geographic information of the network devices and overall network footprint, and the like. In some instances, the simulator may be in communication with one or more databases storing the network data. The network information databases may be generated and/or updated by network crawlers that transmit network information requests to one or more devices of the network 102 and receive responsive information from the same. In other examples, network administrators may obtain and store the network data and information in the network databases for use by the simulator.

Figure 3:
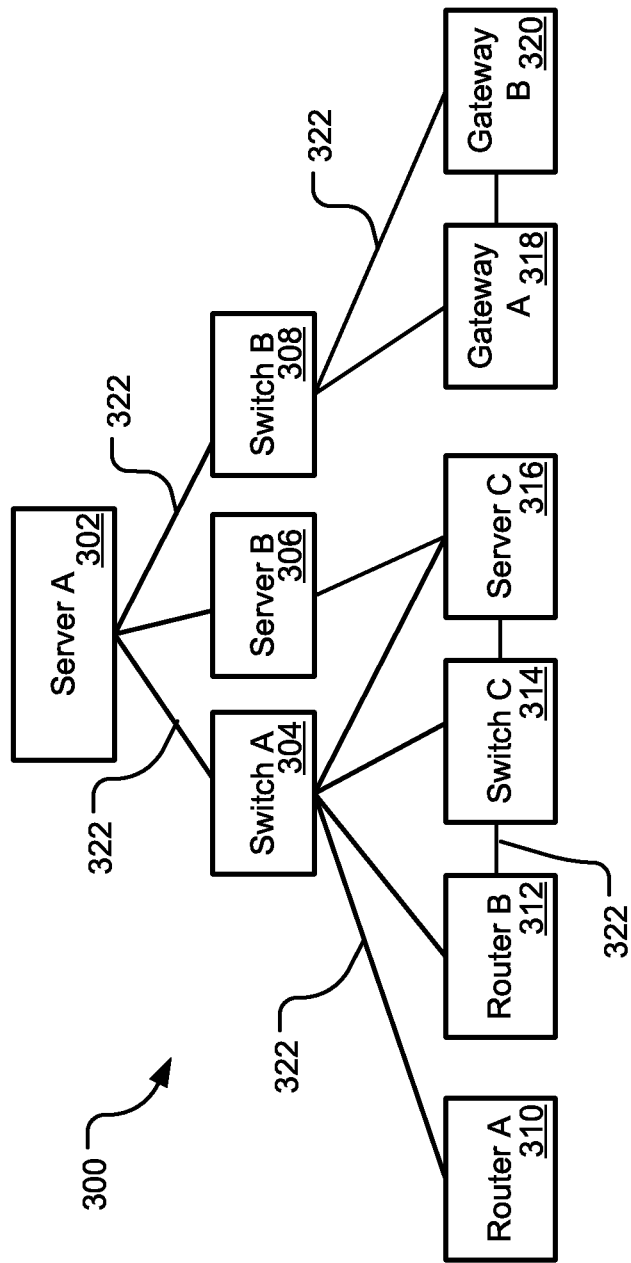
FIG. 3 is a block diagram of a network model generated to represent a communications network topology in accordance with one embodiment.

In operation 204, the simulator may generate, based on the network information obtained from the database, an initial network model, such as the example network model 300 illustrated in FIG. 3. As shown, the network model 300 may include nodes 302-320 corresponding to components of the network 102, such as server A 302, switch A 304, router A 310, gateway A 318, and the like. As noted above, a communications network 102 may include hundreds or thousands of components such that the network model 300 may include hundreds or thousands of corresponding nodes within the model. The model 300 of FIG. 3 is provided as a simplified version of the network model for ease of understanding. The network model 300 may also include edges 322 connecting the nodes 302-320 of the model 300. The edges represent communication paths or transmission lines between the network components 302-320. In general, each component of the network 102 may include routing tables, routing algorithms, decisions trees, and the like that describe the routing procedures of the corresponding one or more network devices. The edges 322 of the network model 300 may represent the possible communication paths between the network components. For example, server A 302 may be connected, via a network communication path or transmission line, to switch A 304, server B 306, and switch B 308. Thus, the network model 300 may include edges 322 connecting server A 302 to those components 304-308. Further, nodes 302-320 may be connected to multiple other nodes such that the nodes have multiple input and output paths or edges 322. In some instances, each node 302-320 of the network model 300 may be connected to every other node such that a network mesh is generated in the initial network model.

Simulation of one or more failure scenarios may occur on the initial network model 300. In some instances, simulation of a failure scenario may include applying a traffic load to one or more nodes of the network model 300, causing removal or overloading of a node, and determining a traffic load on other nodes or edges of the network model 300 based on the removal or overloading. However, due to the large number of nodes 302-320, edges 322, and potential failure scenarios, simulating the effect of the failure scenario on an entire network 102 may significantly increase the time and computation power needed to complete each simulation, particularly for large communication networks included hundreds or thousands of network component represented in the network model 300. For large network models 300, simulations of failure scenarios may take several processors or computing devices upwards of 40 minutes to complete.

To reduce the computation time and power consumed during a simulation, one or more transformations may be applied to the initial network model 300 in operation 206. In general, application of a transformation to the network model may reduce the size of the network model by combining or removing similar portions of the initial network model 300 (such as reducing the total number of nodes 302-320 included in the model or combining nodes with similar edges 322) to reduce the number of calculations that are performed during simulation of a failure scenario on the network model. In some instances, the transformations applied to the initial network model may be reversible such that the initial network model may be recreated after simulation of the transformed network model. In other words, the combining or reduction of nodes 302-320 and/or edges 322 due to the transformations may be reversible such that the initial network model 300 may again be determined or obtained by the simulator. Further, the transformations may be applied to the initial network model 300 so as not to alter the results of the failure simulations. In other words, the worst-case values obtained through the simulations may not be altered due to the transformations applied to the initial network model 300 but may instead be obtained as if applied to the network model before transformation.

Many types of transformations or transforming techniques may be applied to the initial network model 300 to reduce the number of nodes 302-320 and/or edges 322 in the initial network model. For example, in one implementation a dynamic pseudo-node generation transformation may be applied to the initial network model 300 that combines nodes of similar configurations. In a dynamic pseudo-node generation transformation, nodes with similar operations and/or configurations may be combined into a "pseudo-node" that represents the combined network components. For example, some network devices, like edge routers with the same configuration, may operate in the same manner and may be collapsed into a single node of the network model. In a dynamic pseudo-node transformation, nodes within the initial network model 300 representing devices with the same or similar configurations may be combined if doing so does not cause the initial network model to lose information or operate differently when routing traffic. In another transformation technique, particular geographic regions of the network may be simulated separately to reduce the complexity of the initial network model 300. For example, the network 102 may include only a few interfaces between different geographic areas (e.g., a network portion in Africa and a network portion in North America). As such, particular types of failures within the North American portion of the network 102 may not reverberate out to impact the African portion of the network. Thus, when simulating a fault scenario on the North American portion of the network model 300, aspects of the African portion of the network model 300 may be reduced or eliminated as those components may not be affected in the failure scenario. As such, the initial network model 300 may include location information for each node 302-320 in the model, such as a geographic indicator, country location code, a common language location identifier (CLLI), a latitude and/or longitude value, and the like. From this information, the simulator may determine the geographic location of the network components represented in the model 300 and determine which components may be unaffected by the simulated failure scenario. Those nodes may be then removed from the network model 300 during geographic region transformation to further reduce the number of nodes 302-320 in the simulated network model. In this manner, the overall complexity of the initial network model may be reduced.

Another transformation that may be applied to the initial network model 300 may include reducing the number of failure scenarios simulated on the model. Some failure scenarios may include the same network circuits, components, transmission lines, etc., such as a simulated transmission line cut connecting two or more components or an entire site failure that affects each network component within the failed site. Failure scenarios that impact the same circuits or devices of the network 102 may be combined so that the simulation is not running the same scenario two or more times. In still another transformation, parallel links or edges 322 of the initial network model 300 may be collapsed into a single link between nodes 302-320 such that a failure of one link 322 may be simulated on the combined parallel links. By simulating the failure on the combined links, the number of failure scenarios being simulated may be reduced by the number of combined links.

Through application of one or more of the transformations described above, the initial network model 300 may be reduced in size (e.g., the number of nodes and/or edges) and complexity (e.g., the number of interconnections between the nodes) to generate a transformed network model potentially comprising fewer nodes and/or edges as a result of the transformation techniques. In operation 208 of FIG. 2, the simulator may generate a list of failure scenarios to be applied to the transformed network model to obtain one or more results of network performance in response to the failure scenarios. In one implementation, each of the failure scenarios may include a list of failed Layer 3 circuits that are mapped to the physical configuration or topology of the network 102. Further, the failure scenarios may include any number of network circuits. For example, the failure scenarios may be generated to test the performance of a portion of the network 102, such as a new configuration or addition to the network topology, in response to one or more failures of circuits within that portion. In another example, the failure scenario may include failures at disparately located circuits within the network 102 to determine the performance of the network in response to the failures. The failure scenarios may be, in some instances, generated or provided by a network administrator to determine the network 102 operation and test the durability of the network configuration.

With the transformed network model and the failure scenarios determined, simulation of the failure scenarios on the transformed network model may occur. In operation 210, the simulator may determine which of several simulator algorithms that may be utilized to simulate the determined failure scenarios. In particular, one or more simulation algorithms may be selected by the simulator based on the routing algorithms of the network 102 or components of the network from which the initial network model 300 is generated. Several example simulation algorithms are described below in more detail based on various types of routing algorithms or schemes employed by components of the network 102. As these routing schemes determine the transmission of packets through the network 102, tailored simulation algorithms may reduce the complexity and computational power needed to simulate the network in one or more of the failure scenarios. As such, through the selected simulation algorithms, the time and power needed to simulate the network model may further be reduced.

Figure 4:
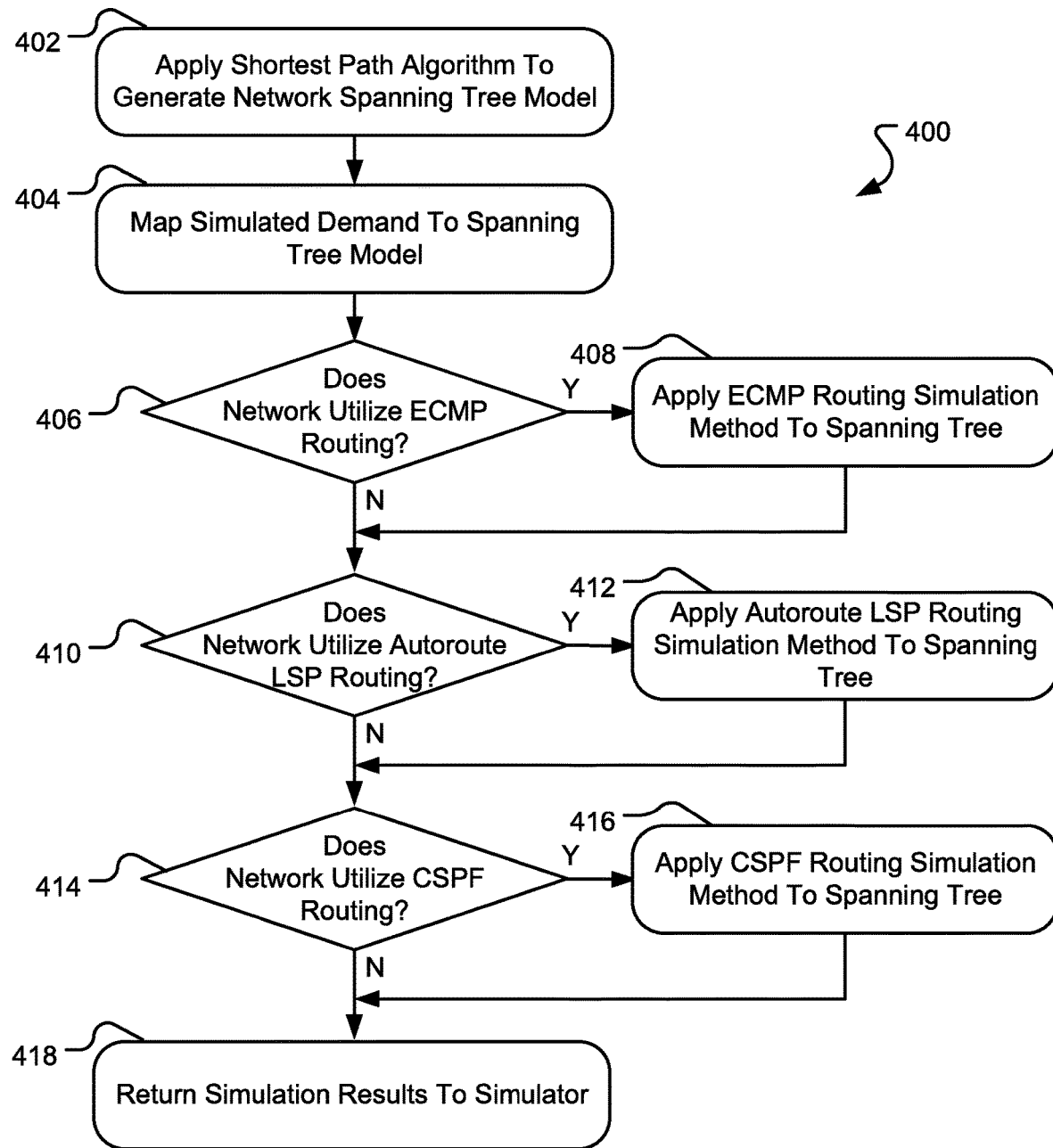
FIG. 4 is a flowchart illustrating a method for simulating one or more network failure scenarios on the network model in accordance with one embodiment.

In operation 212, the simulator may simulate each of the failure scenarios on the transformed network model utilizing one or more of the selected simulation algorithms. In particular, FIG. 4 is a flowchart illustrating a method 400 for simulating the one or more network failure scenarios on the transformed network model in accordance with one embodiment. In one instance, one or more of the operations of the method 400 may be performed by the simulator to obtain network failure performance results, although other computing devices may be utilized to execute or perform the described operations. Further, the operations may be performed via execution of one or more software programs, one or more hardware components, or a combination of software programs and hardware components.

Beginning in operation 402, the simulator may apply a shortest path algorithm to the transformed network model to obtain a network spanning tree model. In general, the shortest path algorithm determines the shortest path in the network model from each node to each other node in the model. For example, each node in a graph of the transformed network, such as network model graph 300, may be selected as a source node and a shortest path may be determined to each other node in the graph and stored. In the example of the network model 300 of FIG. 3, the simulator may determine the shortest path from server A node 302 to every other node 304-320 in the model. As shown, the server A node 302 may transmit communications to switch C node 314 via path switch A 304-switch C 314, switch A 304-router B 312-switch C 314, switch A 304-server C 316-switch C 314, or server B 306-server C 316-switch C 314. The shortest path determination between server A node 302 and switch C node 314 may identify the switch A 304-switch C 314 path as the shortest path (based on two hops to reach switch C node 314 rather than three hops). In another instance, the shortest path algorithm may determine or include a distance that communications are transmitted along each possible path and select the shortest path. Shortest path determinations may be performed for each node in the network model, resulting in a spanning tree of the transformed network model that includes only the shortest path from each node to each other node in the tree, thereby removing longer paths between the nodes of the model 300. Through the shortest path algorithm, optimized paths through the modeled network are obtained.

In operation 404, a simulated demand is mapped to the spanning tree model of the network to approximate a network traffic condition on the modeled network. The estimated or simulated demand may be based on the network data and information obtained above and may be based on the Layer 3 traffic of the network 102. For example, the simulator may determine an average Layer 3 traffic load for one or more circuits of the network 102 based on network traffic data stored in a database and accessible by the simulator. Such traffic load data may be averaged for any amount of time, such as a previous day, a previous week, previous year, etc. To apply the simulated demand, the simulator may determine a path through the transformed network model for each demand and add the demand to the spanning tree corresponding to the network topology. In one instance, mapping the demand to the spanning tree includes determining the traffic load between nodes of the transformed network model 300 and mapping the demand to the shortest path between each of the nodes 302-320. However, this approach typically includes verifying the shortest path results from the shortest path algorithm discussed above for every selected node 302-320 of the network model 300. In an alternate approach, the entire spanning tree result from the shortest path algorithm may be verified or evaluated in one pass through the spanning tree when applying the demand to the tree. In particular, the verification process may start at the leaves of the spanning tree result and the demand may be accumulated or determined as the verification proceeds along the transmission paths and through the predecessor nodes from the leaves to the source node. This process may continue until all demand has reached the source node and may then be mapped to the spanning tree. In one implementation, the simulator may transpose the spanning tree to reverse the transmission paths before traversing the spanning tree from the leaves to the source node. The transposed spanning tree may then be traversed by following the determined shortest paths along the reversed transmission paths to map the demand to the spanning tree.

In many instances, the modeled network utilizes shortest path to route transmissions through the network such that the shortest path model may be useful in simulating the network performance. However, some devices or components of the network 102 may utilize other routing schemes different than shortest path to route traffic through the network. In such circumstances and as mentioned above, one or more simulation algorithms may be selected and applied to the network model 300 based on routing schemes utilized by the devices of the network 102 for nodes of the graph 300 (corresponding to particular components of the network 102) to simulate the routing of network traffic via those components. For example, one or more devices or components of the network 102 may utilize Equal Cost Multi-Path (ECMP) routing. In general, ECMP routing determines the next-hop of a packet from multiple available "best paths" which may be equally considered as a best path in routing metric calculations performed by the component. The route selected to transmit a packet from the multiple available "best" paths may be based on another metric other than distance, such as cost to the network 102 for providing traffic on that route or available capacity of the qualifying best paths. In some instances, network component that utilize ECMP routing may attempt to equally distribute packets among the available best paths such that selection of a particular available path may be based on the last path selected by the component for routing. As network components may select from among multiple routing paths in ECMP routing, a network model 300 that solely utilizes shortest path routing may not accurately model the network behavior such that simulations performed on such a network model 300 may provide inaccurate performance results. As ECMP routing may not necessarily be modeled as a single route or edge 322 from a node, a more complex decision tree may be utilized, adding complexity to the network model 300. Further, as the spanning tree of the network model is constructed in reverse (from target node to source node) as described above, the tree model may need to be traversed first in one direction (from target node to source node) and then again in the opposite direction (from source node to target node) to determine how a node corresponding to a network component utilizing ECMP routing may accurately distribute traffic such that a more accurate network model 300 may be generated.

Figure 5:
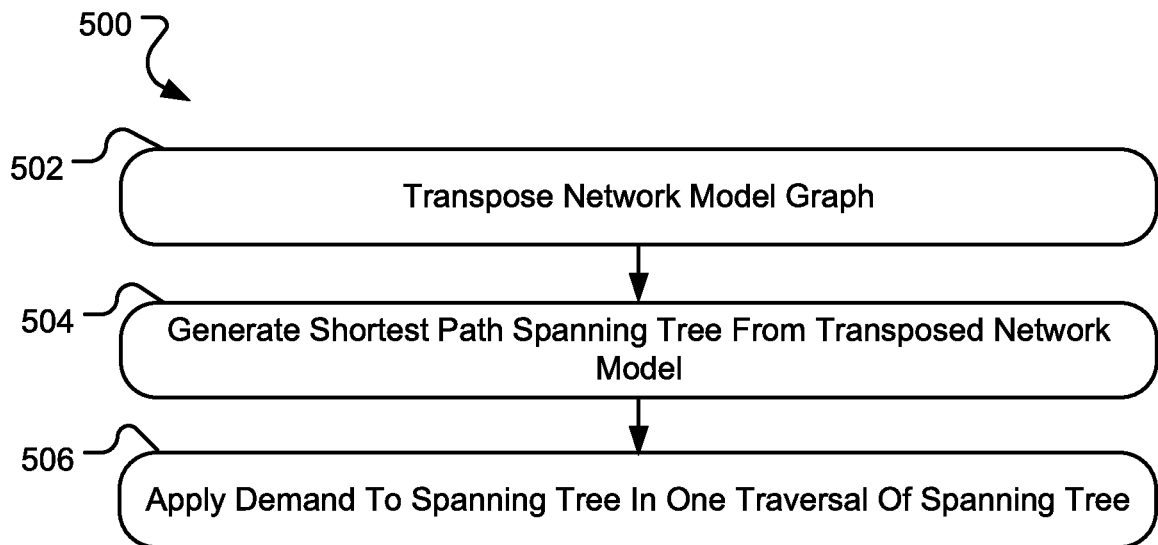
FIG. 5 is a flowchart illustrating a method for simulating Equal Cost Multi-Path routing in a network in accordance with one embodiment.

As such, in operation 406, the simulator may determine if one or more components of the network 102 corresponding to a node of the model 300 utilizes ECMP routing. If ECMP routing is utilized by a modeled component, the simulator may select and apply an ECMP routing simulation method to the transformed network model 300 in operation 408 to account for the variability of the routing decisions made by devices utilizing the ECMP routing. FIG. 5 is a flowchart illustrating a method 500 for simulating ECMP routing of components of a network 102 in accordance with one embodiment. The simulator may perform the method 500 of FIG. 5 in operation 408 of method 400 for network components identified as utilizing ECMP routing decisions or algorithms. Beginning in operation 502, the simulator may transpose the transformed network model such that the modeled transmission paths or edges of the model may be reversed in the transposed model. For example, assume a transmission path through the network model traverses nodes A>B>C>D>E, with node A being the source of the transmission path and the node E the destination node of a routing path. The transposed network model may therefore include a routing path traversing nodes E>D>C>B>A such that node E becomes the source node and node A becomes the destination node. This same transposition of the routing paths through the network model may be applied to the entire network model 300 to generate the transposed network model.

In operation 504, the simulator may apply the shortest path algorithm to the transposed network model to generate the shortest path spanning tree for the network. In particular, the application of the shortest path algorithm may use each destination node as the node from which the shortest path is calculated. As the shortest path algorithm works backward (determining the shortest path from the leaves to the selected source node), applying the algorithm to the transposed network model results in traversal of the shortest path in the correct source-to-destination transmission path of the original or transformed network graph 300. Continuing the above example, node E may be selected as the "source" node for determining the shortest path spanning tree and the determined shortest route provided by the shortest path algorithm follows from node A to node E. In this manner, any node along the transmission route that utilizes ECMP routing may accurately simulate the ECMP decisions for the route in the correct direction. In operation 506, the simulator may then apply the demand or simulated traffic to the shortest path spanning tree in one traversal of the tree, as described above, by starting at the leaves of the tree (here the source nodes or beginning of the transmission route due to the transposition of the network model) and traversing the tree to the source (here the destination nodes or end of the transmission route due to the transposed model). By transposing the network model before applying the shortest path algorithm to the model, the ECMP routing decisions may be made during the shortest path calculations, reducing the time used to perform the network modeling and simulation.

Returning to method 400 of FIG. 4, regardless of if the network utilizes ECMP routing, the simulator may determine, in operation 410, if one or more devices of the network 102 utilizes auto-routing of Label-Switched Paths (LSPs). In particular, some networks employ Multi-Protocol Label Switching (MPLS) routing in which labels (rather than Internet Protocol (IP) addresses or other network identifiers) are used to route packets within the MPLS network. Routing labels are applied to and removed from packets by networking devices within the network as packets enter and exit the MPLS network. MPLS networks typically utilize shortest path routing as implemented through the MPLS labeling procedures. However, in some cases, auto-routing LSPs may be used to route packets through an MPLS network different than a shortest path routing scheme. Auto-route LSPs are transmission paths that are always used by network components to route network traffic, even in cases where the LSP is not the shortest path between two components or nodes of the network. In some network models, auto-route LSPs are added into shortest path spanning trees to replace transmission paths or portions of transmission paths. For example, assume a shortest path in a spanning tree through nodes A>X>J>K>L>Y>B. Also assume an auto-route LSP of X>Y such that traffic transmitted between component X and component Y always follows the direct auto-route X>Y. In this circumstance, the spanning tree associated with the network 102 may replace the segment from X>Y in the transmission path with the LSP such that the new path will be A→X→Y→B. In some instances, the X>Y may be a longer path than the determined shortest path between the nodes. However, network components using auto-route LSP routing will always transmit network traffic along the auto-route LSP.

Figure 6:
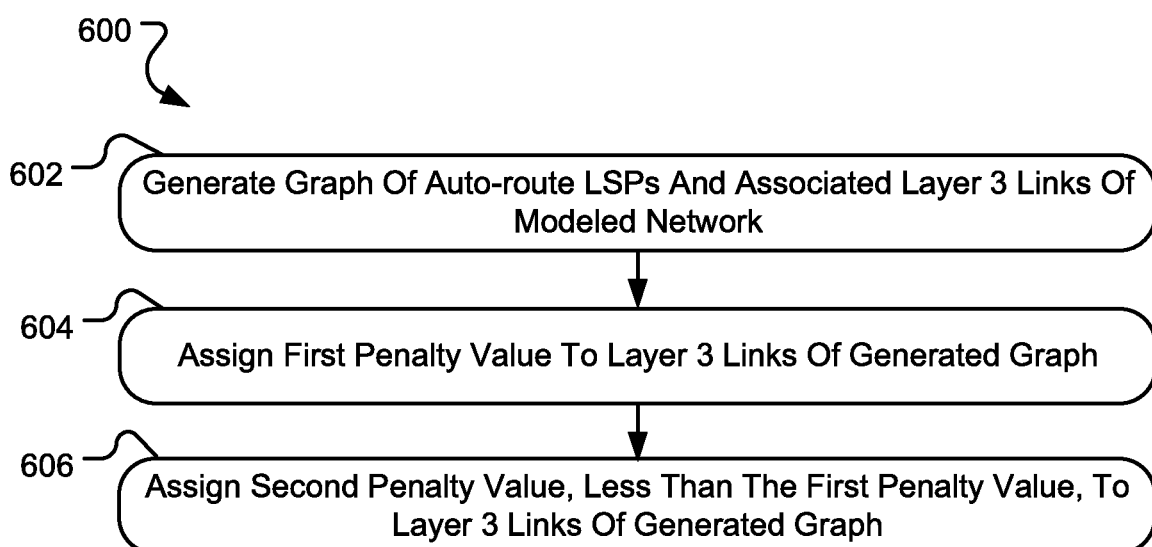
FIG. 6 is a flowchart illustrating a method for simulating auto-route Label-Switched Paths (LSP) routing in a network in accordance with one embodiment.

If the simulator determines, in operation 410, that one or more components of the network 102 utilizes auto-route LSP routing schemes, the simulator may select and apply an auto-route LSP simulation algorithm to the network model in operation 412 to account for the auto-route. To apply the auto-route LSPs simulation algorithm to the network model 300, one approach includes emulating the network 102, computing all of the shortest paths as described above, and replacing nodes or components within the shortest paths of the spanning tree with the auto-route LSPs of the network. Continuing the above example, generation of the spanning tree may include removing node J, node K, and node L as the auto-route does not use those components or nodes when transmitting traffic. However, this approach may be time consuming to execute based on the size and complexity of the network 102. Therefore, in an alternate approach, a penalty value may be assigned or otherwise associated with auto-route LSPs during generation of the network model 300 such that the associated Layer 3 links in the network model 300 are forced into determining the shortest path, without the need to compute all of the potential paths for the corresponding component or node. In particular, FIG. 6 is a flowchart illustrating a method 600 for simulating auto-route Label-Switched Paths (LSP) routing in a network in accordance with one embodiment. As above, the simulator may perform the operations of the method 600 to simulate network models that include auto-route LSP routing schemes and may be executed in association with operation 412.

In operation 602, the simulator may generate a graph with one or more of the auto-route LSPs utilized by the network 102 and the associated Layer 3 links of the auto-route LSPs in the network 102. The associated Layer 3 links may include identification of components associated with the auto-route LSP and the link between the components. In one instance, the information of the graph may be obtained from the network information or database discussed above. In operation 604, the simulator may assign a penalty metric to each shortest path calculation associated with the components using auto-route LSP routing to bias the selection of the auto-route over the calculated shortest path. In one particular implementation, the simulator may add a penalty value of 0.01 to the shortest path metric for each Layer 3 listed in the graph to bias the nodes of the graph to model selection of the auto-route, although any penalty value may be added to the shortest path metric for the Layer 3 link. In a similar manner in operation 506, the simulator may add a penalty value of 0.001 to the shortest path metric for each LSP listed in the graph, although any penalty value may be added to the shortest path metric for the LSP link. As the penalty added to the shortest path metric for the LSP routes is greater than the penalty applied to the Layer 3 auto-route links, the shortest path algorithm applied above determines the auto-route LSP route as preferred over the Layer 3 link. Further, as the transmission path is traversed from source to destination, the auto-route LSP will be selected in the shortest path algorithm based on the added penalty, ensuring that the model operates in a similar manner as auto-routing of the network 102. In some instances, this may be accomplished without computing all of the paths in the network 102 but rather limiting the computations of the simulator to the auto-route LSPs of the network 102.

Figure 7:
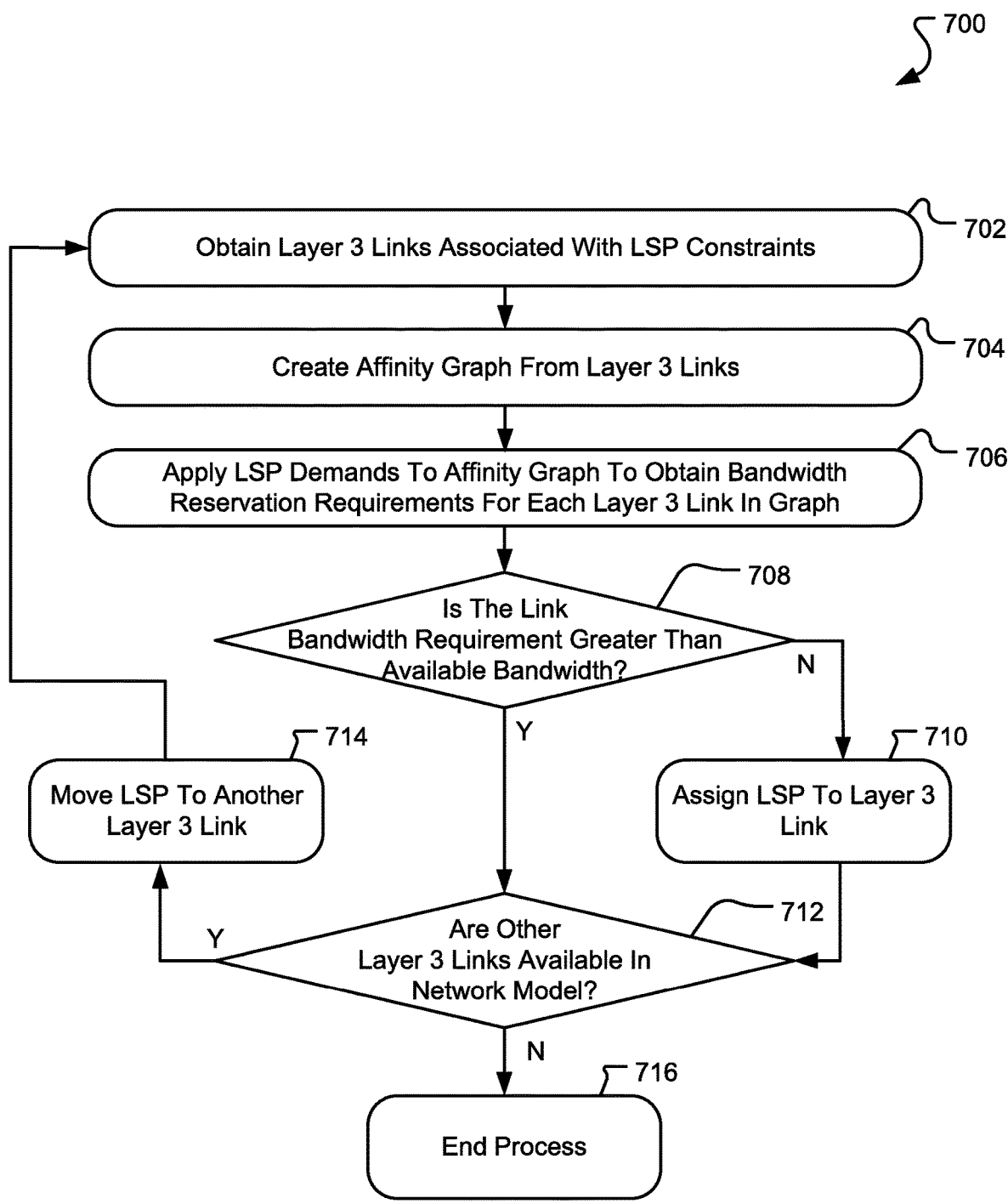
FIG. 7 is a flowchart illustrating a method for simulating Constrained Shortest Path First (CSPF) routing in a network in accordance with one embodiment.

In addition to or in place of auto-routing, some MPLS networks may utilize Constrained Shortest Path First (CSPF) routing in one or more components of the network 102 which can limit the Layer 3 links available to an LSP route. For example, one CSPF constraint is a bandwidth constraint that associates each LSP route with a bandwidth reservation value. For network components routing based on CSPF, traffic may only be routed on Layer 3 links with enough reservable bandwidth as set by the bandwidth constraint for that link, with LSPs typically contending for the same bandwidth. Emulating or simulating this routing scheme on a network model 300 may require additional execution time as the model may simulate the CSPF routing decision for each packet processed by the component during the simulation. To model such a CSPF routing scheme and reduce the simulation time used to simulate a network failure, the simulator may determine, in operation 414, if one or more network devices represented in the network model 300 utilizes CSPF routing and, if so, may apply a CSPF routing simulation method to the spanning tree in operation 416. One particular routing simulation technique is illustrated in the method 700 of FIG. 7, in accordance with one embodiment. The operations of the method 700 may be performed by the simulator for modeled a network that includes at least one device or component that utilizes CSPF routing of traffic to simplify the simulation of the CSPF routing decisions made by the simulated component.

Beginning in operation 702, the simulator may determine the sets of Layer 3 links that match the various LSP affinities included in the network infrastructure or data. From the Layer 3 links, the simulator may generate an affinity graph in operation 704. The affinity graph may associate the Layer 3 links with the LSP affinities identified in the network. Further, each LSP may be applied to the affinity graph as traffic demands on the associated Layer 3 links. In operation 706, the simulator may apply the obtained traffic demands from the network information to the affinity graph to obtain bandwidth reservation requirements for each of the Layer 3 links in the graph. In operation 708, the simulator determines if the Layer 3 link bandwidth need from the affinity graph is greater than the available bandwidth for that Layer 3 link. If the available bandwidth is greater than the link bandwidth requirement, a conflict is not present and the LSP may be assigned to the Layer 3 link in the network model 300 and spanning tree generated from the network model. However, if the available bandwidth is less than the link bandwidth requirement, the simulator may determine to move the LSP to another Layer 3 link in the network model 300 and resultant spanning tree. Thus, in operation 712, the simulator may determine if other Layer 3 links of the network model 300 are available for the affected LSP. In other words, the simulator may analyze the affinity graph to determine if another Layer 3 link is available for the LSP affected by exceeding the available bandwidth of the Layer 3 link.

If other Layer 3 links remain for the LSP, the simulator may move the LSP to another Layer 3 link (or route) in operation 714 and check that the Layer 3 link reservation requirement is less than the LSP available bandwidth. If no additional Layer 3 links remain the network model 300, however, the simulator may proceed to operation 716 and end the process. The above process may continue until there are no violations of Layer 3 link bandwidth or until all LSP rerouting has been exhausted. By routing the LSPs of the network 102 and moving LSPs based on available Layer 3 link bandwidth onto other edges of the network graph 300, simulation of the network model 300 via the spanning tree may proceed without needing to simulate the CSPF decision for every packet received at a modeled network component that utilizes CSPF routing. This may significantly improve the computational time used to simulate fault scenarios on the network model 300 as the CSPF decisions are accounted for in the generated spanning tree from the network model 300.

Returning to FIG. 4, the simulator may conduct the simulation of the network model 300 (and/or the spanning tree generated from the network model) in operation 418, utilizing one or more of the above described simulation algorithms and return the simulation results to the simulator. In particular, the simulator may loop through each of the failure scenarios discussed above to obtain the circuit utilizations, traffic bandwidth, dropped traffic, and other network performance data during the failure conditions. The simulation algorithms discussed above may be used in each iteration of the looping simulations to reduce the time and power consumption for the simulations. In some instances, the impacted routes of the network model 300 may be determined and the calculations for a failure scenario may be limited to the impacted links or LSPs. For example, a failure scenario may only impact a small number of links or LSPs of the network such that calculation of the impact on the traffic conditions may be limited to those affected aspects of the network. Thus, a link failure of the network may only impact the paths that use the failed link, while other paths in the network model 300 may not be affected. Limiting the shortest path simulation to the most likely node or nodes affected by the failure may limit the number of iterations of the executions of the algorithms discussed above to further improve the time needed to perform the simulation. However, to utilize the transposed network graph for a limited simulation, a common node to each edge or link affected by the failure may be identified and the impact to that node may be calculated. For example, two computations may be performed with the affected node as the source in the original network graph 300 and with the affected node as the source node in the transposed network graph. These two computations, one based on the network model and one based on the transposed network model, may provide the simulator with the calculations needed to determine worst-case values for each circuit.

Determining the affected node for a particular failure scenario may include generating a graph of affected demands from a failure of a network component by associating each demand to an edge 322 in the model 300. A vertex cover may be determined by generating a set of nodes 302-320 such that each edge 322 has at least one endpoint in the set. An algorithm may then be executed to find this set and determine the node 302-320 with the highest degree of likelihood to be the affected node of the simulated failure. Each node in the vertex cover may then be used as the source node in both the original network model 300 and the transposed network model.

Returning to FIG. 2 and following the simulation of the failure scenario on the transformed network model 300 and or spanning tree, the simulator may obtain the worst-case performance data for each circuit of the simulated network model 300 in operation 214. In one instance, the worst-case performance data may be the maximum bandwidth or transmission speed for each circuit obtained during the simulation discussed above. In operation 216, the simulator may reverse the transformations applied to the network model to place the results of the simulation in the context of the original network model. As mentioned above, the transformations applied to the network model 300 may reduce one or more nodes 302-320 and/or edges 322 of the model. In addition, the transformations may be reversible such that the originally generated network model illustrating each node and edge before transformation may be obtained. In operation 218, the worst-case performance data received from the simulation of the network based on the failure scenarios may, in some aspects, be applied to a network optimization algorithm to alter the configuration of the network. For example, if the worst-case performance data received from the simulations exceed a threshold value (such as network capacity limited by a failure, number of customers affected, or other network performance metrics), one or more recommendations to configure the network may be provided by the network optimization algorithm in response to the worst-case performance data. A computing device, such as that described below with reference to FIG. 8, may generate one or more instructions based on the network optimization algorithm to configure one or more components or elements of the network 102 to improve the stability of the network. For example, the generated instructions may alter a configuration of one or more components of the network 102 to generate a back-up or fail-over routing path based on the simulation results. In this manner, the network modeling and simulation may improve the performance of the network in response to one or more failures of components of the network.

Figure 8:
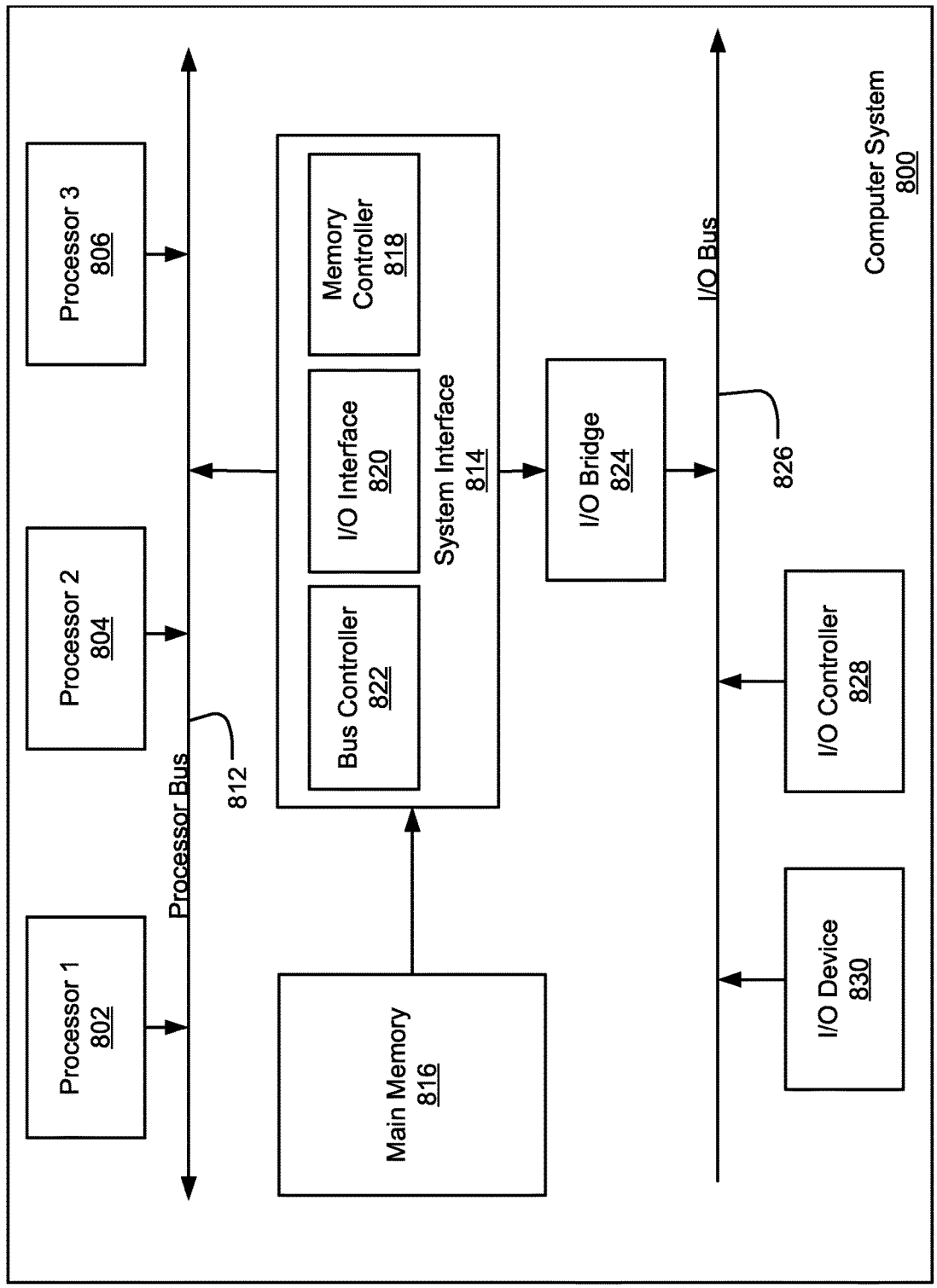
FIG. 8 is a diagram illustrating an example of a computing system which may be used in implementing embodiments of the present disclosure.

FIG. 8 is a block diagram illustrating an example of a computing device or computer system 800 which may be used in implementing the embodiments of the components of the network disclosed above. For example, the computing system 800 of FIG. 8 may be the computing device on which the simulator discussed above is executed. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 814 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 716, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for modeling a telecommunications network, the method comprising:
    generating, by a computing device and based on network data, an initial network model comprising nodes representing components of a network and edges representing connections between components of the network;
    applying a transformation to the initial network model to combine nodes and edges of the initial network model and reduce a number of nodes and edges of the initial network model;
    generating, based on the transformed network model, a shortest path network model comprising edges corresponding to a shortest path determination between a plurality of nodes of the transformed network model; and
    simulating, by the computing device and based on the shortest path network model, a failure scenario of the network, wherein the simulation comprises altering a characteristic of an edge of the shortest path network model based on a routing scheme of the network,
    wherein the routing scheme is an auto-routing Label-Switched Path (LSP) routing scheme and wherein generating the shortest path network model comprises:
        generating a graph of auto-route LSP paths of the network and corresponding communication links of the network; and
        associating a first penalty value to the auto-route LSP paths of the graph and a second penalty value to the corresponding communication links of the graph.

2. The method of claim 1, wherein simulating the failure scenario further comprises:
    obtaining, in response to the altering of the characteristic of the edge of the shortest path network model, simulated performance characteristics of a node of the shortest path network model, the node corresponding to a particular component of the network.

3. The method of claim 2 further comprising:
    altering, based on the simulated performance characteristics of the node of the shortest path network model, a configuration of the particular component of the network configuration.

4. The method of claim 2 further comprising:
    applying the simulated performance characteristics of the node of the shortest path network model to a network model obtained by reversing the application of the transformation to the initial network model.

5. The method of claim 1, wherein the transformation comprises a dynamic pseudo-node generation transformation to combine nodes of the initial network model with corresponding configurations.

6. The method of claim 1, wherein the routing scheme is an Equal Cost Multi-Path (ECMP) routing scheme and wherein generating the shortest path network model comprises transposing the transformed network model to reverse a dependency between the plurality of nodes of the transformed network model.

7. The method of claim 6, wherein simulating the failure scenario of the network further comprises applying a simulated traffic load on the reverse dependency of the transposed network model.

8. The method of claim 1, wherein the routing scheme is a Constrained Shortest Path First (CSPF) LSP routing scheme and wherein generating the shortest path network model comprises:
    associating an LSP path of the network to a corresponding communication link of the network to generate an affinity graph of the network;
    applying a traffic demand on the affinity graph; and
    determining a bandwidth allocation for each of the corresponding communication links of the network based on the affinity graph.

9. A computing device comprising:
    a processing device; and
    a non-transitory computer-readable medium encoded with instructions, when executed by the processing device, cause the processing device to perform the operations of:
        generating, based on network data obtained from a database, an initial network model comprising nodes representing components of a network and edges representing connections between components of the network;
        applying a transformation to the initial network model to combine similar nodes and edges of the initial network model and reduce a number of nodes and edges of the initial network model;
        generating, based on the transformed network model, a shortest path network model comprising edges corresponding to a shortest path determination between a plurality of nodes of the transformed network model;

simulating, based on the shortest path network model, a failure scenario of the network, the simulation comprising altering a characteristic of an edge of the shortest path network model based on a routing scheme of a communication link of the network corresponding to the edge; and obtaining, based on the simulated failure scenario, an operating characteristic of the network, wherein the routing scheme is an auto-routing Label-Switched Path (LSP) routing scheme and wherein the instructions further cause the processing device to perform the operations of:

generating a graph of auto-route LSP paths of the network and corresponding communication links of the network; and associating a first penalty value to the auto-route LSP paths of the graph and a second penalty value, less than the first penalty value, to the corresponding communication links of the graph.

10. The computing device of claim 9, wherein the operating characteristic of the network is associated with a node of the shortest path network model, the node corresponding to a particular component of the network.

11. The computing device of claim 10, wherein the instructions further cause the processing device to perform the operation of:

generating, based on the obtained operating characteristic of the node of the shortest path network model, a configuration instruction for altering a configuration of the particular component of the network configuration.

12. The computing device of claim 9, wherein the routing scheme is an Equal Cost Multi-Path (ECMP) routing scheme and wherein the instructions further cause the processing device to perform the operation of transposing the transformed network model to reverse a dependency between the plurality of nodes of the transformed network model.

13. The computing device of claim 12, wherein simulating the failure scenario of the network further comprises applying a simulated traffic load on the reverse dependency of the transposed network model.

14. The computing device of claim 9, wherein the routing scheme is a Constrained Shortest Path First (CSPF) LSP routing scheme and wherein the instructions further cause the processing device to perform the operations of:

associating an LSP path of the network to a corresponding communication link of the network to generate an affinity graph of the network;

applying a traffic demand on the affinity graph; and determining a bandwidth allocation for each of the corresponding communication links of the network based on the affinity graph.

15. A non-transitory computer readable media comprising computer executable instructions to perform a computer-implemented method of modeling a telecommunications network comprising:

generating, based on network data obtained from a database, an initial network model comprising nodes representing components of a network and edges representing connections between components of the network;

applying a transformation to the initial network model to combine similar nodes and edges of the initial network model and reduce a number of nodes and edges of the initial network model;

generating, based on the transformed network model, a shortest path network model comprising edges corresponding to a shortest path determination between a plurality of nodes of the transformed network model; and simulating, based on the shortest path network model, a failure scenario of the network, wherein the simulation comprises altering a characteristic of an edge of the shortest path network model based on a routing scheme of the network, wherein the routing scheme is an auto-routing Label-Switched Path (LSP) routing scheme, and wherein generating the shortest path network model comprises:

generating a graph of auto-route LSP paths of the network and corresponding communication links of the network; and associating a first penalty value to the auto-route LSP paths of the graph and a second penalty value to the corresponding communication links of the graph.

16. The non-transitory computer readable media of claim 15, wherein the computer-implemented method further comprises:

obtaining, in response to the altering of the characteristic of the edge of the shortest path network model, simulated performance characteristics of a node of the shortest path network model, the node corresponding to a particular component of the network.

17. The non-transitory computer readable media of claim 16, wherein the computer-implemented method further comprises:

generating, based on the obtained performance characteristic of the node of the shortest path network model, a configuration instruction for altering a configuration of the particular component of the network configuration.

18. The non-transitory computer readable media of claim 16, wherein the computer-implemented method further comprises:

applying the simulated performance characteristics of the node of the shortest path network model to a network model obtained by reversing the application of the transformation to the initial network model.

* * * * *